US008860810B2

(12) United States Patent
Large

(10) Patent No.: US 8,860,810 B2
(45) Date of Patent: Oct. 14, 2014

(54) METHOD AND DEVICE FOR EXTENDING A VISIBILITY AREA

(75) Inventor: Frederic Large, Montigny-le-Bretonneux (FR)

(73) Assignee: Peugeot Citroen Automobiles SA, Route de Gisy, Velizy Villacoublay (FR)

( * ) Notice: Subject to any disclaimer, the term of this patent is extended or adjusted under 35 U.S.C. 154(b) by 416 days.

(21) Appl. No.: 13/321,515

(22) PCT Filed: May 10, 2010

(86) PCT No.: PCT/FR2010/050900
§ 371 (c)(1),
(2), (4) Date: Nov. 18, 2011

(87) PCT Pub. No.: WO2010/133785
PCT Pub. Date: Nov. 25, 2010

(65) Prior Publication Data
US 2012/0062739 A1     Mar. 15, 2012

(30) Foreign Application Priority Data
May 18, 2009  (FR) ..................................... 09 53271

(51) Int. Cl.
H04N 7/18     (2006.01)
G01S 15/02    (2006.01)
B60R 1/00     (2006.01)
G06T 3/40     (2006.01)
G06T 7/00     (2006.01)
G01S 15/93    (2006.01)

(52) U.S. Cl.
CPC ............. B60R 1/00 (2013.01); G01S 2015/938 (2013.01); G01S 15/025 (2013.01); B60R 2300/30 (2013.01); B60R 2300/806 (2013.01); B60R 2300/402 (2013.01); B60R 2300/301 (2013.01); G01S 15/931 (2013.01); B60R 2300/304 (2013.01); B60R 2300/8066 (2013.01); G06T 3/4038 (2013.01); G06T 2207/30252 (2013.01); B60R 2300/607 (2013.01); G06T 2207/10016 (2013.01); B60R 2300/305 (2013.01); G06T 7/0028 (2013.01)
USPC ....................................................... 348/148

(58) Field of Classification Search
USPC ....................................................... 348/143
See application file for complete search history.

(56) References Cited

U.S. PATENT DOCUMENTS

2005/0027186 A1\* 2/2005 Chen et al. ..................... 600/407
2006/0210145 A1\* 9/2006 Lee et al. ........................ 382/154
(Continued)

FOREIGN PATENT DOCUMENTS

EP     1094337 A2    4/2001
EP     1646008 A1    4/2006
(Continued)

OTHER PUBLICATIONS

International Search Report corresponding to International Application No. PCT/FR2010/050900, mailed Aug. 6, 2010.

*Primary Examiner* — Dave Czekaj
*Assistant Examiner* — Tracy Li
(74) *Attorney, Agent, or Firm* — Polster, Lieder, Woodruff & Lucchesi, L.C.

(57) ABSTRACT

In order to extend a visibility area of a camera mounted on a vehicle, the method of the invention comprises a step of generating a basic virtual image ($I_{2v}$) in which a set of pixels of the basic virtual image is correlated with a set of pixels of a real image ($I_{1R}$) captured by the camera while taking into account that the set of pixels of the real image reproduces a planar surface of the real world, and a step of building a virtual cumulative image ($I_{3v}$) in which at least a portion of the basic virtual image ($I_{2v}$) is superimposed on at least a portion of the cumulative virtual image ($I_{3v}$) while coinciding the points of interest of the basic virtual image ($I_{2v}$) with the points of interest of the cumulative virtual image ($I_{3v}$).

17 Claims, 4 Drawing Sheets

(56) References Cited

U.S. PATENT DOCUMENTS

2007/0122027 A1* 5/2007 Kunita et al. ............... 382/154
2008/0205706 A1    8/2008 Hongo
2009/0232415 A1* 9/2009 Uyttendaele et al. ........ 382/284
2010/0165105 A1* 7/2010 Mizusawa .................... 348/148

FOREIGN PATENT DOCUMENTS

| EP | 1830321 A2 | 9/2007 |
| EP | 1964719 A2 | 9/2008 |
| EP | 2129548 B1 | 4/2011 |

* cited by examiner

METHOD AND DEVICE FOR EXTENDING A VISIBILITY AREA

CROSS-REFERENCE TO RELATED APPLICATIONS

The present application is the US National Stage under 35 U.S.C. §371 of PCT/FR2010/050900 which was filed on May 10, 2010 and which claims the priority of French application 0953271 filed on May 18, 2009.

BACKGROUND

The invention concerns a method for extending a visibility area obtained by means of a camera mounted on a vehicle, in particular on a motor vehicle.

In particular, the field of the invention comprises visual reversing aid (VRA) systems, using one or more cameras. The aim of such systems is to assist the driver during low-speed manoeuvres, displaying for him an intuitive visual representation of the near environment around the vehicle.

EP1094337 discloses a system intended to assist a driver during a parking manoeuvre, warning him of the presence of a three-dimensional object detected by means of a single image acquisition apparatus. The disclosed system has the aim of determining the distance which separates the object from the vehicle from two successive image acquisitions which are used to create a stereoscopic view as a function of the displacement of the vehicle calculated from sensors.

This type of embodiment requires a very high precision of the sensors. Furthermore, on movements at low speed as is generally the case during a manoeuvre, the small distance covered by the vehicle between two image acquisitions poses difficulties for a three-dimensional image reconstruction, because this is equivalent to a stereoscopic system having a very short base. Jumping images until a sufficient covered distance is obtained poses the problem of the dynamics of the environment. An object in movement in the scene can not be reconstructed. A sufficiently precise reconstruction of the obstacles requires a costly calculation power. Last and not least of the disadvantages, only the objects which are in the field of the camera during the two successive image acquisitions can be reconstructed.

SUMMARY

To remedy the known disadvantages of the prior art, a method for extending a visibility area obtained by means of a camera mounted on a vehicle is disclosed which comprises:
- a step of generating a basic virtual image in which a set of pixels of the basic virtual image is correlated with a set of pixels of a real image captured by the camera while taking into account that the set of pixels of the real image reproduces a planar surface of the real world;
- a step of characterisation of the basic virtual image in which a set of points of interest of the basic virtual image is generated;
- a step of building a cumulative virtual image in which at least a portion of the basic virtual image is superimposed on at least a portion of the cumulative virtual image while coinciding points of interest of the basic virtual image with points of interest of the cumulative virtual image.

Advantageously, the building step is reiterated for each new basic virtual image which is sufficiently different from a former basic virtual image in terms of distances between the points of interest.

In particular, the method comprises a step of differentiation in which a difference is operated in terms of colour components between each pixel of the new basic virtual image and a corresponding pixel of the former basic virtual image and in which there is attributed to the pixel of the new basic virtual image a transparency level which is a function of the difference.

Advantageously also, in the generating step, the set of pixels of the basic virtual image is correlated with the set of pixels of the real image by a correspondence table.

Advantageously again, the method comprises a display step in which the basic virtual image, as it results from the generating step, is superimposed in real time on the cumulative virtual image to generate an instantaneous display image.

In particular in the display step, a synthesis image is superimposed on the cumulative virtual image.

More particularly, the synthesis image is that of a wheel of the vehicle.

More particularly again, the display step is activated directly after the step of characterization of the basic virtual image for each new basic virtual image equivalent to a former basic virtual image in terms of distances between the points of interest.

Preferably, the planar surface is that of the ground.

More precisely, the camera which is used comprises a retinal plane which is oblique with respect to the planar surface of the real world.

A camera is mounted on a vehicle and is arranged to implement the method.

DESCRIPTION OF THE FIGURE

Other characteristics and advantages of the method will emerge more clearly from the description which is given below, by way of indication and in no way restrictedly, with reference to the attached drawings, in which.

DETAILED DESCRIPTION

Figure 1:
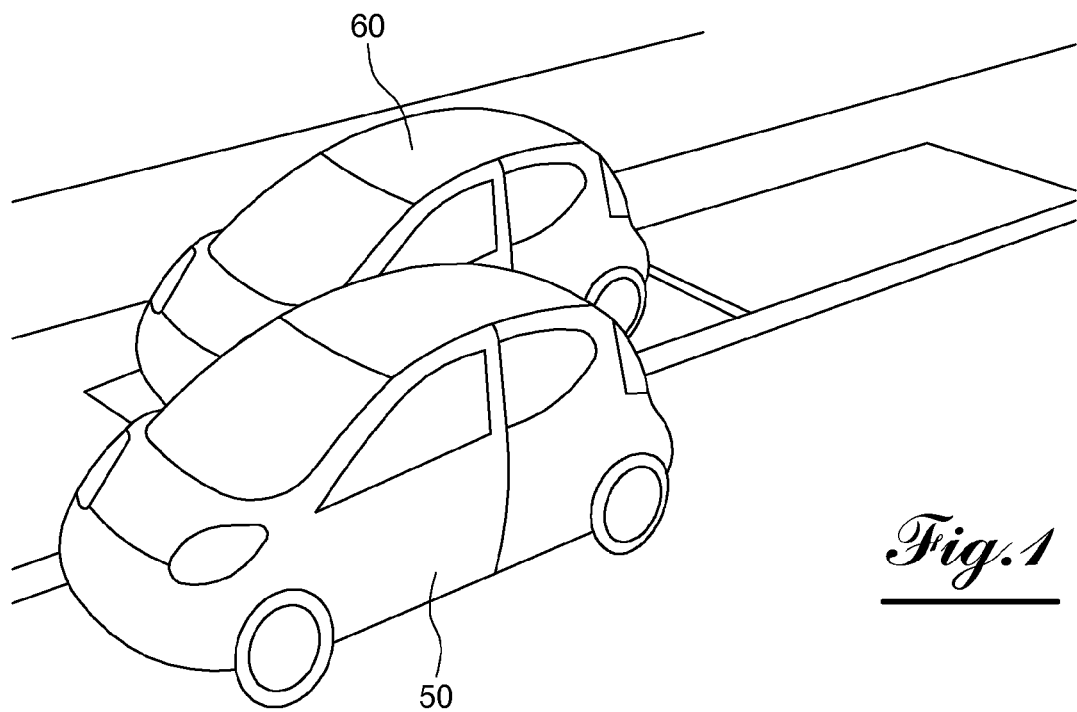
FIG. 1 is a perspective view of a vehicle in a manoeuvre phase.

FIG. 1 shows a vehicle 50 in a manoeuvre phase close to a vehicle 60.

Figure 2:
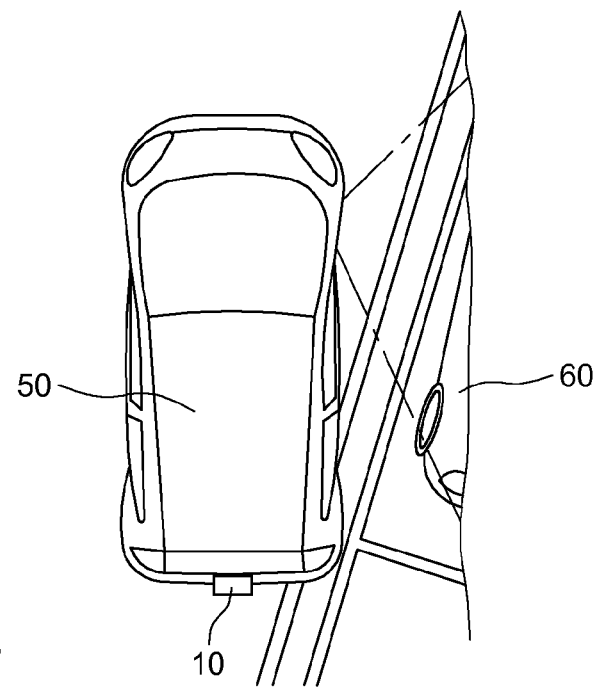
FIG. 2 is a top view of the vehicle of FIG. 1.

FIG. 2 shows the vehicle 50 equipped with a camera 10 at the rear.

The method, explained with reference to FIG. 3, begins from an initial step 100 in which the system, when it is started up, is on standby whilst the speed V of the vehicle is greater than a threshold speed $V_S$. In fact, with the method and the system being provided to assist the driver to manoeuvre, it is not necessarily useful to cause them to function when the vehicle is travelling en route.

Starting from the step 100, a detection of speed V below the threshold speed Vs confirms a transition 101 which activates a step 102.

The step 102 includes capturing a real image $I_{1R}$ of the space covered by the field of the camera 10 at the rear of the vehicle 50, so as to create by projection a top view of the ground situated behind the vehicle in the field of view of the camera.

Figure 4:
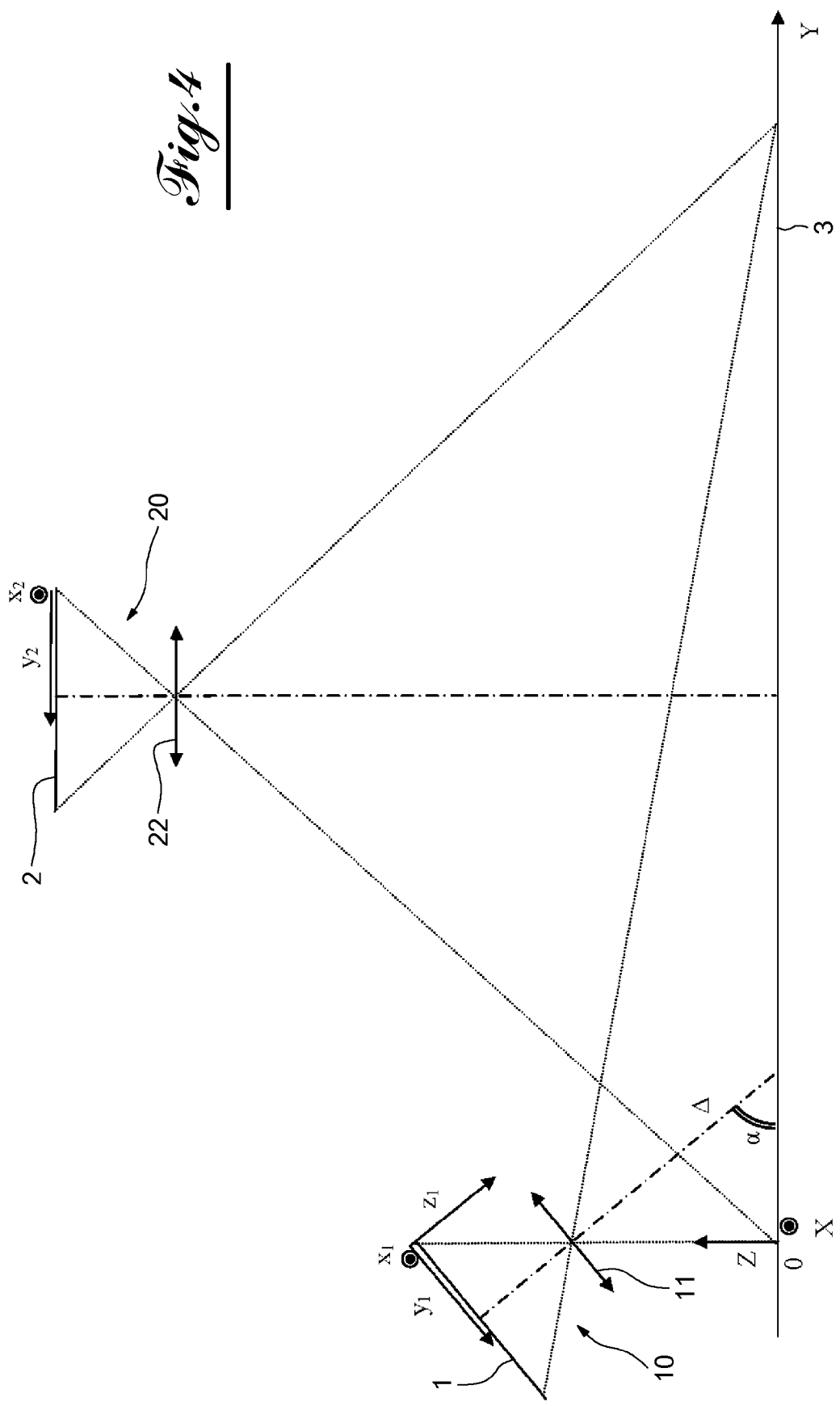
FIG. 4 is an explanatory diagram of the physical properties which are used.

In FIG. 4, an optical system 11 has been represented and a retinal plane 1 of the real camera 10 on which a real image $I_{1R}$ of the ground 3 is formed. An axis Δ perpendicular to the retinal plane 1 passes through the optical centre of the optical system 11. A mark $o_1x_1y_1z_1$ linked to the retinal plane 1 has its axis $z_1$ parallel to the axis Δ oriented towards the ground 3 and its origin $o_1$ at a height $A_1$ above the ground of a constant value, which results from the mounting of the camera 10 on the vehicle 50. A mark OXYZ linked to the vehicle has its origin O at the level of the ground to the vertical of the origin $o_1$, its axis X parallel to the horizontal axis $x_1$ and its horizontal axis Y perpendicularly to the axis X. The axis Δ forms an angle α with the plane of the ground.

The homogeneous coordinates $w_1u_1$, $w_1v_1$, $w_1$ in a projective plane of the mark $o_1x_1y_1z_1$ to $z_1=0$, are linked to the coordinates $u_1$, $v_1$ of the points of the real image on the retinal plane by the coefficient of proportionality $w_1$. By applying to the camera 10, the model of the pinhole, the homogeneous coordinates $w_1u_1$, $w_1v_1$, $w_1$ of each point of the image corresponding to a point at the level of the ground of coordinates X, Y, 0 in the mark OXYZ, are given by a transformation of known type:

$$\begin{pmatrix} w_1 u_1 \\ w_1 v_1 \\ w_1 \end{pmatrix} = \begin{bmatrix} \Gamma_{1u} & \sigma_{uv} & c_{1u} \\ 0 & \Gamma_{1v} & c_{1v} \\ 0 & 0 & 1 \end{bmatrix} \begin{bmatrix} f_1 & 0 & 0 & 0 \\ 0 & f_1 & 0 & 0 \\ 0 & 0 & 1 & 0 \end{bmatrix} \begin{bmatrix} 1 & 0 & 0 & 0 \\ 0 & -\sin\alpha & -\cos\alpha & 0 \\ 0 & \cos\alpha & -\sin\alpha & -A_1 \\ 0 & 0 & 0 & 1 \end{bmatrix} \begin{pmatrix} X \\ Y \\ 0 \\ 1 \end{pmatrix}$$

In this transformation, the coefficients $\Gamma_{1u}$ and $\Gamma_{1v}$ are the magnification factors of the image. A zero value can be attributed to the coefficient $\sigma_{uv}$ when the lines and the columns of photosensitive electronic cells which compose the sensor of the camera are orthogonal. The coordinates $c_{1u}$ and $c_{1v}$ of the projection of the optical centre of the camera on the image plane are those of the intersection of the axis Δ with the retinal plane 1. The coefficient $f_1$ represents the focal distance of the camera 10. The camera is fixed on the vehicle with a constant view angle towards the ground so as to give constant values to the coefficients of the transformation.

By multiplying the above three matrices, the transformation can also be written as:

$$\begin{pmatrix} w_1 u_1 \\ w_1 v_1 \\ w_1 \end{pmatrix} = \begin{bmatrix} m_{1uX} & m_{1uY} & m_{1uZ} & m_{1u} \\ m_{1vX} & m_{1vY} & m_{1vZ} & m_{1v} \\ m_{1wX} & m_{1wY} & m_{1wZ} & m_{1w} \end{bmatrix} \begin{pmatrix} X \\ Y \\ 0 \\ 1 \end{pmatrix}$$

By developing the calculations, the value of the coefficient of proportionality $w_1$ is given by the formula:

$$w_1 = Y\cos\alpha - A_1$$

At each point of coordinates $u_1$, $v_1$ in the real image $I_{1R}$ therefore one and one single point of coordinates X, Y corresponds in the plane of the ground.

In FIG. 4, an optical system 22 has also been represented and a retinal plane 2 of a virtual camera 20, on which there is formed a virtual image $I_{2V}$ of the ground 3. A perpendicular axis to the retinal plane 2 and to the plane of the ground 3 passes through the optical center of the optical system 22. A mark $0_2x_2y_2z_2$ linked to the retinal plane 2 has its plane $z_2=0$ parallel to the plane of the ground 3 and its origin $0_2$ at a height $A_2$ above the ground of constant value, so as to embrace the same area to the ground as the camera 10.

Just as for the real camera 10, the homogeneous coordinates $w_2u_2$, $w_2v_2$, $w_2$ in a projective plane of the mark $o_2x_2y_2z_2$ to $z_2=0$, are linked to the coordinates $u_2$, $v_2$ of the points of the virtual image on the retinal plane by the coefficient of proportionality $w_2$. By also applying to the camera 20, the model of the pinhole, the homogeneous coordinates $w_2u_2$, $w_2v_2$, $w_2$ of each point of the image corresponding to a point at the level of the ground of coordinates X, Y, 0 in the mark OXYZ, are given by a transformation similar to the one previously explained.

$$\begin{pmatrix} w_2 u_2 \\ w_2 v_2 \\ w_2 \end{pmatrix} = \begin{bmatrix} m_{2uX} & m_{2uY} & m_{2uZ} & m_{2u} \\ m_{2vX} & m_{2vY} & m_{2vZ} & m_{2v} \\ m_{2wX} & m_{2wY} & m_{2wZ} & m_{2w} \end{bmatrix} \begin{pmatrix} X \\ Y \\ 0 \\ 1 \end{pmatrix}$$

By developing the calculations, the value of the coefficient of proportionality $w_1$ is given by the formula:

$$w_2 = -A_2$$

At each point of coordinates X, Y in the plane of the ground therefore one and one single point of coordinates $u_2$, $v_2$ corresponds in the virtual image $I_{2V}$.

By transitivity of bijections, at each point of coordinates $u_1$, $v_1$ in the real image $I_{1R}$ therefore one and one single point of coordinates $u_2$, $v_2$ corresponds in the virtual image $I_{2V}$ and reciprocally.

Thus, each component of colour of a basic area $dS_2$ constituted by points of planar coordinates $u_2$, $v_2$ in the virtual image $I_{2V}$, is equal to the same component of colour of a basic area $dS_1$ constituted by the corresponding points of planar coordinates $u_1$, $v_1$ in the real image $I_{1R}$.

When the calculation resources permit, the corresponding points of planar coordinates $u_1$, $v_1$ are calculated from the transformations previously explained and each component of colour integrated on the basic area $dS_1$ comprising these points is attributed to the basic area $dS_2$ constituted by points of planar coordinates $u_2$, $v_2$ in the virtual image $I_{2V}$.

It will be noted that with the parameters of the cameras being fixed, the correspondences between points of the virtual image $I_{2V}$ and of the real image $I_{1R}$ are constant.

In an advantageous manner, the invention provides a correspondence table at an input indexed by the linear coordinates $k_2$ of the pixels of the virtual image $I_{2V}$. It will be recalled that, with the virtual image $I_{2V}$ comprising $H_2$ lines of $L_2$ pixels per line, a pixel of index j on a line of index i is referenced by a linear coordinate $k_2$ such that:

$$k_2 = iL_2 + j$$

At each input indexed by $k_2$ there is associated the linear coordinate $k_1$ of a pixel of the real image $I_{IR}$ comprising the point of planar coordinates $u_1$, $v_1$ which corresponds to the point of planar coordinates $u_2$, $v_2$ on which the pixel of linear coordinate $k_2$ is centred.

This correspondence table allows savings to be made in terms of material resources and in terms of execution. In terms of material resources, the correspondence table can be housed in a memory location comprising simply L*H memory segments for the linear coordinates $k_2$ and L*H memory segments for the associated linear coordinates $k_1$. In terms of execution resources, a simple scanning of the inputs of the correspondence table sufficient to define the pixels of the virtual image with reference to the corresponding pixels of the real image is remarkably quick.

Figure 3:
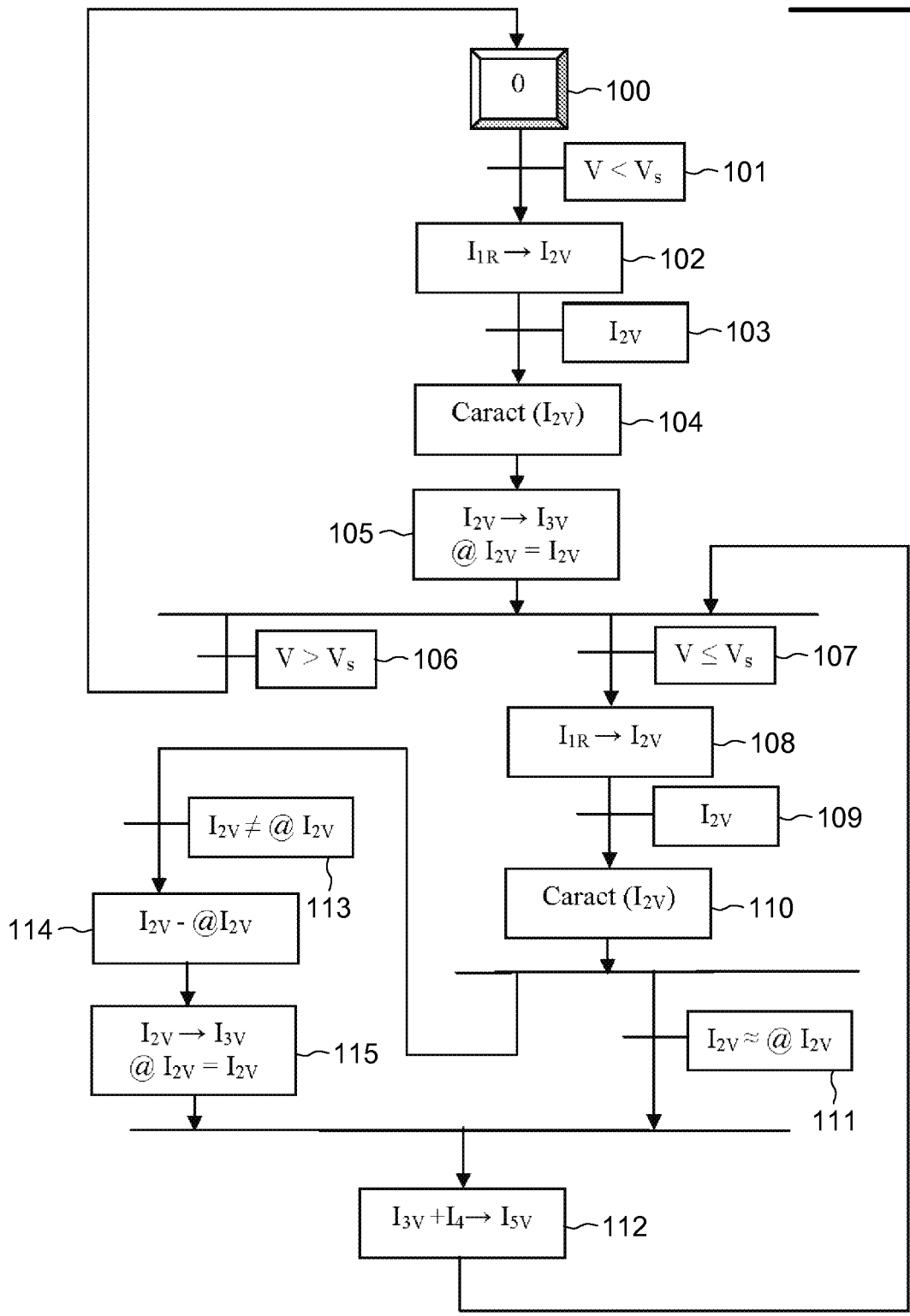
FIG. 3 shows method steps according to the invention.

Starting from the step 102 represented in FIG. 3, the obtaining of the virtual image $I_{2V}$ confirms a transition 103 which activates a step 104.

The step 104 consists in determining points of interest which characterize the virtual image $I_{2V}$. Different methods can be used to determine the points of interest. For example the points of interest of the Harris type are known, which are linked to singular points of the image such as for example a curb-side. The Harris and Stephen algorithm has the merit of being simple and quick. Other more complex algorithms have the merit of being more robust by offering a better immunity to noise, to variations in lighting and to abrupt variations in justification.

By way of purely illustrative and non-restrictive example, the methods of blob detection can be mentioned, which are distributed in differential methods and in local extrema method. Considering a component of colour having the value $F(u_2, v_2)$ for a pixel of coordinates $u_2$, $v_2$, and a Gaussian filter of value $G(u_2, v_2, \sigma)$ given by a formula of the type:

$$G(u_2, v_2, \sigma) = \frac{1}{2\pi\sigma}e^{-\frac{u2+v2}{2\sigma}}$$

in which $\sigma$ is a scale factor, the system generates a three-dimensional representation of two spatial dimensions and of one scale dimension $L(u_2,v_2, \sigma)$ given by the convolution product:

$$L(u_2,v_2,\sigma):=G(u_2,v_2,\sigma)*F(u_2,v_2)$$

The system then stores the coordinates $u_2$, $v_2$ of each pixel and the scale factor $\sigma$ which correspond to a local extremum of the Laplacian $\Delta(L)$ of L:

$$\Delta L(u_2, v_2, \sigma) := \frac{\partial_2 L(u_2, v_2, \sigma)}{\partial u_2^2} + \frac{\partial_2 L(u_2, v_2, \sigma)}{\partial v_2^2}$$

The step 104 thus produces a list of points of interest of the virtual image comprising the pixels of coordinates $u_2$, $v_2$, with the scale factor corresponding to an extremum of the Laplacian, i.e. a maximum or a minimum, indeed a maximum in one direction and a minimum in another direction.

In the step 105 which follows, a virtual image $I_{3V}$ is created in the memory. The virtual image $I_{3V}$ is intended to represent a top view of the environment of the vehicle which goes beyond the area covered by the instantaneous virtual image $I_{2V}$. At the start, the virtual image $I_{3V}$ comprises simply the first instantaneous virtual image $I_{2V}$ which has just been calculated. In accordance with the invention, the virtual image $I_{3V}$ will be built in the following steps progressively as the vehicle moves.

The following steps 108 to 112 are executed in real time, under the control of a transition 107, in so far as the speed V of the vehicle is lower than the threshold speed $V_S$ and of course in so far as the method is activated. The method is deactivated, for example, by withdrawal of the ignition key.

A detection of speed V greater than the threshold speed confirms a transition 106 which reactivates the step 100, thus returning the system into standby state.

A detection of speed V less than or equal to the threshold speed confirms the transition 107 which activates a step 108.

At each execution of the step 108 a new real image $I_{1R}$ is captured by means of the camera 10. A new virtual image $I_{2V}$ of the ground in top view is produced from the real image $I_{1R}$ as explained above with regard to step 102.

Starting from the step 108 represented in FIG. 3, the obtaining of the virtual image $I_{2V}$ confirms a transition 109 which activates a step 110.

The step 110 consists in determining points of interest which characterize the new virtual image $I_{2V}$, as explained above with regard to step 104. The new virtual image $I_{2V}$ is compared with a former virtual image $@I_{2V}$. The former virtual image $@I_{2V}$ is the last virtual image $I_{2V}$ which was integrated in the virtual image $I_{3V}$ on the execution of step 105 or on a preceding execution of a step 115 explained below. The new virtual image $I_{2V}$ is considered equivalent to the former virtual image $@I_{2V}$ in so far as the distance between each point of interest of the former virtual image $@I_{2V}$ and the point of interest which corresponds thereto in the new virtual image $I_{2V}$ is lower than a predetermined threshold value. The distance can concern a Euclidian distance on the situation of the pixels in the plane of the image. The distance can also concern a difference of level between a component of colour of the point of interest of the former virtual image $@I_{2V}$ and the same component of colour of the point of interest which corresponds thereto in the new virtual image $I_{2V}$. The new virtual image $I_{2V}$ is considered different from the former virtual image $@I_{2V}$ as soon as the distance between one or more points of interest of the former virtual image $@I_{2V}$ and the points of interest which correspond thereto in the new virtual image $I_{2V}$ is greater than the predetermined threshold value.

A transition 111, confirmed when the new image $I_{2V}$ is equivalent to the former image $@I_{2V}$, activates a step 112. The virtual images are equivalent in so far as the vehicle has moved little or has not moved. The new virtual image should not then be taken into account, because small modifications to the stream would risk causing a shift by accumulation of successive errors.

A transition 113, confirmed when the new image $I_{2V}$ is different from the former image $@I_{2V}$, activates a step 114. Typically, the virtual images are distinctly different when the vehicle has sufficiently advanced, reversed or turned.

The step 114 consists in evaluating the difference between the new virtual image $I_{2V}$ and the former virtual image $@I_{2V}$ so as to superimpose a greater possible number of points of interest of the new virtual image $I_{2V}$ on the corresponding points of interest of the former virtual image $@I_{2V}$. For example, displacements of points of interest in the virtual image following a common direction with common values, denotes a movement of the vehicle in translation in an opposite direction to that of the points of interest in the new virtual image. For example again, displacements of points of interest in the virtual image following different directions with different values denotes a movement of the vehicle in rotation or over a curve arc in the opposite direction to that of the points of interest in the new virtual image.

To calculate the affine transformation which causes passage from the former virtual image $@I_{2V}$ to the new virtual image $I_{2V}$, one considers that the points of interest belong to a planar scene which is rigid. In other words, a point of interest which belongs to a part of the new virtual image $I_{2V}$ which is superimposed on the former virtual image $@I_{2V}$, has a point of interest combined in the former virtual image $@I_{2V}$ and the two points of interest are positioned on the same element of the scene. However, owing to noise, points of interest which do not verify the hypotheses of the planar scene or other phenomena, a point of interest of a virtual image cannot have a point of interest combined in the other virtual image which corresponds to an element of the ground or to the same element. Such points of interest, considered outliers, are not taken into account for the superimposition of the two virtual images.

After superimposition of the new virtual image on the former virtual image so as to cause the points of interest to coincide, a distinction is made of a first part of the new virtual image which departs from the framework of the former virtual image and of a second part of the new virtual image which partially covers the former virtual image. This partial covering results from the displacement of the vehicle. The first part will serve to extend the scope of the cumulative virtual image $I_{3V}$. The pixels of the first part do not correspond to any pixel of the former virtual image $@I_{2V}$ and will therefore be able to be integrated just as they are in the cumulative virtual image $I_{3V}$.

Each pixel of the second part of the new virtual image $I_{2V}$ is superimposed on a pixel of the former virtual image $@I_{2V}$, ideally with components of colour RGB or of tone and of luminosity of identical value.

However, reality can be far removed from the ideal situation for several reasons. A first reason is that the hypothesis of a perfectly planar ground at the rear of the vehicle, on which the building of the virtual image $I_{2V}$ is based, is not always verified. An obstacle which projects beyond the ground or which penetrates into the ground does not verify the transformation with a single solution, which results from Z zero. A same point of this obstacle appears with coordinates which are not in accord in the two virtual images. Reciprocally, a pixel, corresponding to a point considered in the plane even though it departs from the plane of the ground in a virtual image, corresponds to another point in the other virtual image.

To take into account this type of heterogeneity, a possible solution involves evaluating the distance which separates the two pixels in terms of components of colour, of tone or of luminosity. The distance between two superimposed pixels can be measured in a space of one dimension of levels of grey or in a space of three dimensions of colours RGB (red green blue), TSB (tone, saturation, brightness value), etc.

A second reason is that even for representative pixels of points in the plane of the ground, the pixels lead to a discretisation which means that two representative pixels of the same point are only superimposed on each other perfectly when the displacement of the vehicle between two acquisitions of views corresponds to a whole number of pixels, which is rarely the case. To respond to this second reason, and as a consequence, to the first reason mentioned above, the method advantageously provides for making a measure of correlation between a first window centred on the pixel in the former virtual image and a second window centred on the pixel which is able to be superimposed in the second virtual image. The correlation is then representative of the pixel in its environment.

So as to gain processing time, the difference based on the coefficient of correlation between the two windows is calculated by a multi-resolution approach, also designated pyramidal. The analogy with a pyramid is as follows for each virtual image. At the base of the pyramid, the virtual image is situated with its original resolution. At each higher level, the resolution of the image is reduced. Generally, the pixel number is divided by two over the length and by two over the width of the image.

The distance which is thus calculated between two pixels is a numerical value, the minima and maxima of which are fixed. The range of values defined by these minima and these maxima is then brought, by scaling and thresholding of the upper values, to a range of values comprised between 0 in the absence of difference and 255 for a total difference. The value which is thus calculated is used as transparency value of each pixel with a view to its addition to the cumulative virtual image $I_{3V}$ in the form of mosaic. A pixel, in the sense in which it is defined in the present method, is characterized by its position in the image, its colour and its transparency, zero by default, which is applied to an opaque pixel. The coding of the transparency is purely conventional without affecting its processing. In the example implementation of the invention described here, a pixel of which the transparency value is maximal at 255 is totally transparent and does not appear when it is superimposed on another pixel, a pixel of which the transparency value is minimal at 0 is perfectly opaque and masks the pixel on which it is superimposed. The conventions can be different, even inverted as is the case in the "Alpha blending" method.

Following step 114, a step 115 comprises superimposing the superimposable parts of the new virtual image $I_{2V}$ on the corresponding parts of the cumulative virtual image or mosaic $I_{3V}$. The transparency allotted to each pixel of the new virtual image $I_{2V}$ allows the pixel to be stored at the height of its degree of opacity. The level of transparency per pixel allows attenuation of the pixels detected to be different between two instants of real image capture due to noise or to correspondence to an obstacle. Stage 115 thus carries out a natural time filtering by only storing cumulatively in the mosaic constituted by the virtual image $I_{3V}$ the most reliable pixels from the point of view of their belonging to the plane of the ground.

Thus, when the vehicle advances slowly in forward gear to prepare to manoeuvre, a view of the plane of the ground of mosaic type is progressively created at the rear of the vehicle. The system can dispense with sensors of the speed of the vehicle or of rotation of the steering wheel, because the points of interest which are generated permit detection of the displacements in translation and in rotation of the vehicle in the plane of the ground. The system naturally detects that the vehicle stops when the points of interest remain fixed and that the vehicle changes direction of displacement as a function of the direction of displacement of the points of interest. When the vehicle reverses, it covers in the opposite direction the plane of the ground previously scanned. The parts of the cumulative virtual image $I_{3V}$, previously at the rear of the vehicle, pass progressively beneath and on the sides of the vehicle until being found again at the front of the vehicle, thus reproducing a top view of an environment which surrounds the vehicle. The vehicle, as it were, in reverse gear penetrates virtually and progressively into the virtual image and then evolves there when it turns or starts again in forward gear.

Step 112 is activated following step 115 to create a display view $I_{5V}$ from the cumulative virtual image $I_{3V}$ which has just been built in mosaic form. The display view $I_{5V}$ is not stored. The display view $I_{5V}$ is created by adding an image $I_4$ in superimpression on the virtual image $I_{3V}$.

The image $I_4$ comprises in particular a specimen of the new virtual image $I_{2V}$ without coefficient of transparency, so as to allow the driver of the vehicle a direct visual monitoring of the scene, in particular if a living being passes behind the vehicle in the field of the real camera 10.

The activation of step 112 directly by the transition 111 or indirectly by the transition 113, passing through step 115, re-updates in real time the view of the man-machine interface (MMI) with the view originating from the reversing camera. This is the guarantee that the driver can have permanently a visual monitoring of his manoeuvre.

A displacement of the vehicle which is too small cannot be approximated with precision by the algorithm. Due to this small displacement, the last virtual image $I_{2V}$ is placed on the preceding mosaic, taking as the hypothesis that the vehicle has not moved. On the other hand, the mosaic is not updated, because very small accumulated displacements could lead to shifts. For this reason, it is necessary to wait for the current image to present sufficient differences with respect to the former image to estimate the displacement with sufficient precision and to correctly rest the last image with the mosaic. In other words, if the vehicle does not move or moves too slowly for its movement to be estimated with sufficient precision by the algorithm, the user continues to have a re-actualized view which takes into account a presence of a pedestrian or any moving obstacle passing in the field of the real camera, but the mosaic remains unchanged. As soon as the movement of the vehicle is perceptible by the user and consequently by the algorithm the mosaic is updated and reset.

By entering $_{the}$ data of the vehicle such as its dimensions, its shape and its colour, in the form of parameters in the system at the time of its mounting on the vehicle, it is possible to display a diagram of the vehicle on the plane of the ground.

The image $I_4$ optionally comprises a 3D synthesis image of objects beyond the plane of the ground which may constitute obstacles to the manoeuvre. The synthesis image can be built by time stereoscopy from two successive real images $I_{1R}$ which are sufficiently distant from each other.

The use of ultrasonic sensors as a supplement to the system allows the proximity of an obstacle to be indicated in the zone covered by each sensor. The distribution of the sensors on the periphery of the vehicle, for example at the level of the front and rear bumpers, allows a rough cartography to be reconstructed of the proximity of any obstacles around the vehicle.

The information provided by the ultrasonic sensors is able to be used by the system in different ways:
  in a passive manner, the zones associated to each ultrasonic sensor are superimposed graphically above the image of the ground. The user therefore has at his disposal simultaneously visual information of the ground around the vehicle and visual information of the presence of an obstacle returned by the ultrasonic sensors.
  in an active manner, the presence of an obstacle deduced from the transparencies can be compared with the cartography of the obstacles which is returned by the ultrasonic sensors. This information can then be amalgamated to obtain greater precision.
  in a combined active and passive manner, the display of the cartography of the obstacles provided by the ultrasonic sensors is superimposed on the image of the ground, within the framework of a passive visual indication. Furthermore, the presence of a close obstacle which is detected by the ultrasonic sensors is used to adapt the displayed view so as to re-centre it on this zone, thus realizing an active adaptive zoom.

With regard to the handling of the man-machine interface (MMI), several variants are provided, amongst which there is indicated a use of touch screens, a use of a designator of the dial type, arranged to select the active view from a set of predefined choices, a use of exterior input data such as the adaptive zoon as a function of the obstacles detected by ultrasonics.

After a sufficient reversing of the vehicle, the method allows the plane of the ground beneath the vehicle and on the sides of the vehicle to be known. It is then possible to easily reproduce a three-dimensional synthesis image of a wheel in a plane perpendicular to the plane of the surrounding ground. A front wheel can be represented with its steering angle when the pertinent information is available, for example from the messaging of the vehicle or from a calculation of the rotation of the vehicle about an axis perpendicular to the plane which results from the displacements of the characteristic points on the basic virtual images $I_{2V}$.

Figure 5:
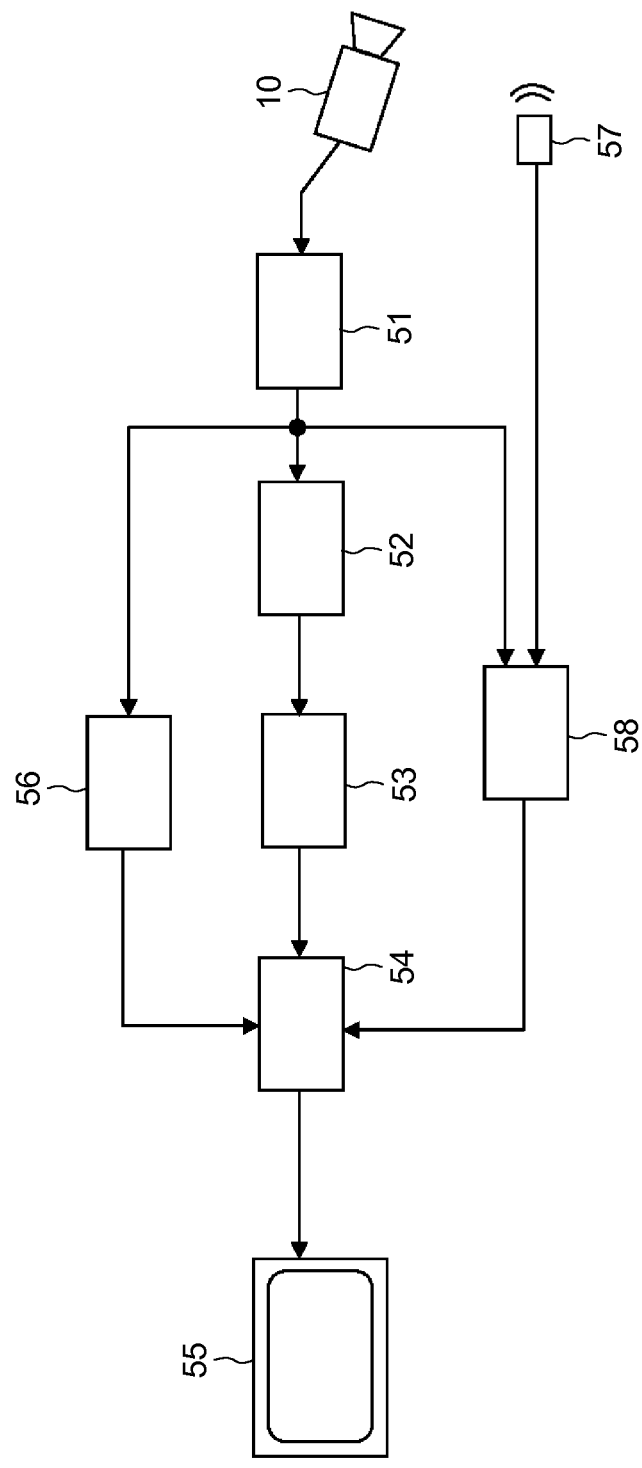
FIG. 5 is a diagrammatic view of the device according to the invention.

FIG. 5 represents diagrammatically a system for implementing the method which has just been explained.

The camera 10 mounted at the rear of the vehicle comprises a reticular plane which is oblique with respect to the plane of the ground, as has been seen above with reference to FIG. 4. The reticular plane can go up to being perpendicular to the plane of the ground, but then the visualized area of the ground in the vicinity of the vehicle is small. Unlike aerial views where a camera placed underneath an aircraft allows one to have a resulting view of the plane of the ground owing to the altitude at which the aircraft flies over the ground, a camera placed beneath the vehicle or at the rear of the vehicle with a reticular plane parallel to the surface of the ground would only embrace a relatively restricted space. The reticular plane of the camera not parallel to the plane of the ground allows an area to be covered with extends considerably further to the rear and on the sides of the vehicle.

Each video image captured by the camera 10 is transmitted to a module 51 at the refreshing rate in real time. The module 51 is arranged to correct the distortions caused by the optical system of the camera, in particular in the presence of a short focal length lens, also designated wide angle, which allows one to have an extended base visibility zone in an appreciable manner towards the rear and the sides of the vehicle.

The real images which are processed by the module 51 are transmitted to a module 52 which calculates a top view as explained above. The module 52 is essentially arranged to execute the steps 102 and 108 of the method. It will be noted that the particularly economical resources, a simple single-input correspondence table, allow the modules 51 and 52 to be easily integrated into the camera 10. Optionally, provision is made to transmit the real images which are processed by the module 51 to a module 56 and/or to a module 58.

The module 56 is arranged to build objects in three dimensions, which will be integrated in the image displayed on a screen 55 via a display module 54. The objects can be built from images received from the module 51 and segmentation algorithms or from geometric and colorimetric data issued from a database which describes, for example, the body of the vehicle or the mounting of the wheels.

The module 58 is also arranged to build objects in three dimensions which will be integrated in the image displayed on the screen 55 via the display module 54. The objects can be built here from signals received from an ultrasonic sensor 57 and if applicable from the images received from module 51.

The basic virtual images generated by the module 52 are transmitted to a module 53 arranged essentially to execute the steps 104, 105, 110 and 115 of the method, so as to build the accumulated virtual image which extends the visibility of the ground beneath and around the vehicle.

The virtual image built in the module 52 is transmitted to the display module 54 essentially arranged to execute step 112.

The invention claimed is:
1. A method for extending a visibility area obtained by means of a camera mounted on a vehicle, comprising:
  a step of generating a basic virtual image ($I_{2V}$) in which a set of pixels of the basic virtual image is correlated with a set of pixels of a real image ($I_{1R}$) captured by the camera while taking into account that the set of pixels of the real image reproduces a planar surface of the real world, a step of characterization of the basic virtual image ($I_{2v}$) in which a set of points of interest of the basic virtual image ($I_{2v}$) is generated;

a step of building a cumulative virtual image ($I_{3v}$) in which at least a portion of the basic virtual image ($I_{2v}$) is superimposed on at least a portion of the cumulative virtual image ($I_{3v}$) while coinciding points of interest of the basic virtual image ($I_{2v}$) with points of interest of the cumulative virtual image ($I_{3v}$); the building reiterated for each new basic virtual image ($I_{2v}$) which is sufficiently different from a former basic virtual image ($@I_{2v}$) in terms of distances between the points of interest; and a step of differentiating in which a difference is operated in terms of colour components between each pixel of the new basic virtual image ($I_{2v}$) and a corresponding pixel of the former basic virtual image ($@I_{2v}$) and in which there is attributed to the said pixel of the new basic virtual image ($I_{2v}$) a transparency level which is a function of the said difference.

2. The method according to claim 1 wherein in the generating step, the set of pixels of the basic virtual image is correlated with the set of pixels of the real image by a correspondence table.

3. The method according to claim 1 further comprising a display step in which the basic virtual image as it results from the generating step is superimposed in real time on the cumulative virtual image ($I_{3v}$) to generate an instantaneous display image ($I_{5v}$).

4. The method according to claim 3, wherein in the display step, a synthesis image is superimposed on the cumulative virtual image ($I_{3v}$).

5. The method according to claim 4, wherein the synthesis image is that of a wheel of the vehicle.

6. The method according to claim 1, wherein the planar surface is that of the ground.

7. The method according to claim 1, wherein the camera which is used comprises a retinal plane which is oblique with respect to the said planar surface of the real world.

8. A device comprising a camera mounted on a vehicle, wherein the device is arranged to implement the method of claim 1.

9. A method for extending a visibility area obtained by means of a camera mounted on a vehicle, comprising:

a step of generating a basic virtual image ($I_{2v}$) in which a set of pixels of the basic virtual image is correlated with a set of pixels of a real image ($I_{1R}$) captured by the camera while taking into account that the set of pixels of the real image reproduces a planar surface of the real world, a step of characterization of the basic virtual image ($I_{2v}$) in which a set of points of interest of the basic virtual image ($I_{2v}$) is generated;

a step of building a cumulative virtual image ($I_{3v}$) which at least a portion of the basic virtual image ($I_{2v}$) is superimposed on at least a portion of the cumulative virtual image ($I_{3v}$) while coinciding points of interest of the basic virtual image ($I_{2v}$) with points of interest of the cumulative virtual image ($I_{3v}$); and a step of displaying the basic virtual image as it results from the generating step is superimposed in real time on the cumulative virtual image ($I_{3v}$) to generate an instantaneous display image ($I_{5v}$); the display step being activated directly after the step of characterization of the basic virtual image ($I_{2v}$) for each new basic virtual image ($I_{2v}$) equivalent to a former basic virtual image ($@I_{2v}$) in terms of distances between the points of interest.

10. The method according to claim 9, wherein the building step is reiterated for each new basic virtual image ($I_{2v}$) which is sufficiently different from a former basic virtual image ($@I_{2v}$) in terms of distances between the points of interest.

11. The method according to claim 9 wherein in the generating step, the set of pixels of the basic virtual image is correlated with the set of pixels of the real image by a correspondence table.

12. The method according to claim 9 further comprising a display step in which the basic virtual image as it results from the generating step is superimposed in real time on the cumulative virtual image ($I_{3v}$) to generate an instantaneous display image ($I_{5v}$).

13. The method according to claim 12, wherein in the display step, a synthesis image is superimposed on the cumulative virtual image ($I_{3v}$).

14. The method according to claim 13, wherein the synthesis image is that of a wheel of the vehicle.

15. The method according to claim 9, wherein the planar surface is that of the ground.

16. The method according to claim 9, wherein the camera which is used comprises a retinal plane which is oblique with respect to the said planar surface of the real world.

17. A device comprising a camera mounted on a vehicle, wherein the device is arranged to implement the method of claim 9.

* * * * *